March 20, 1956  J. H. SUTTER  2,738,838
GLASS BLOCK VENTILATING DEVICE
Filed June 4, 1952  4 Sheets-Sheet 1
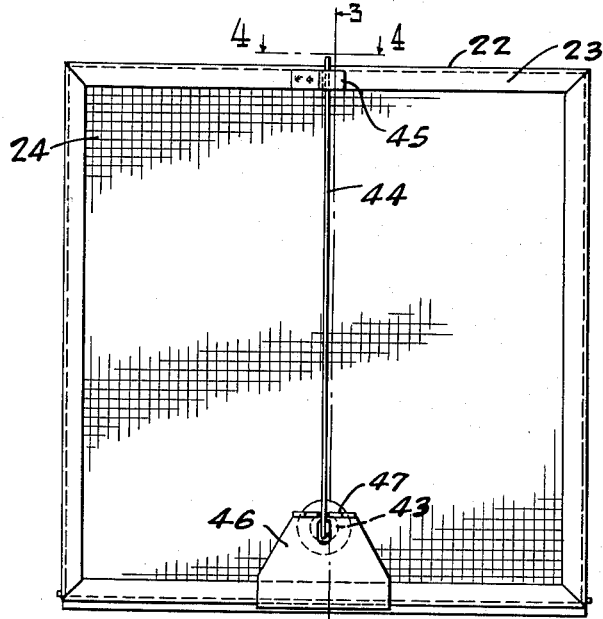
Fig. 1.
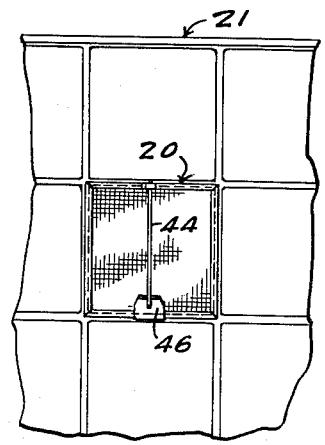
Fig. 2.
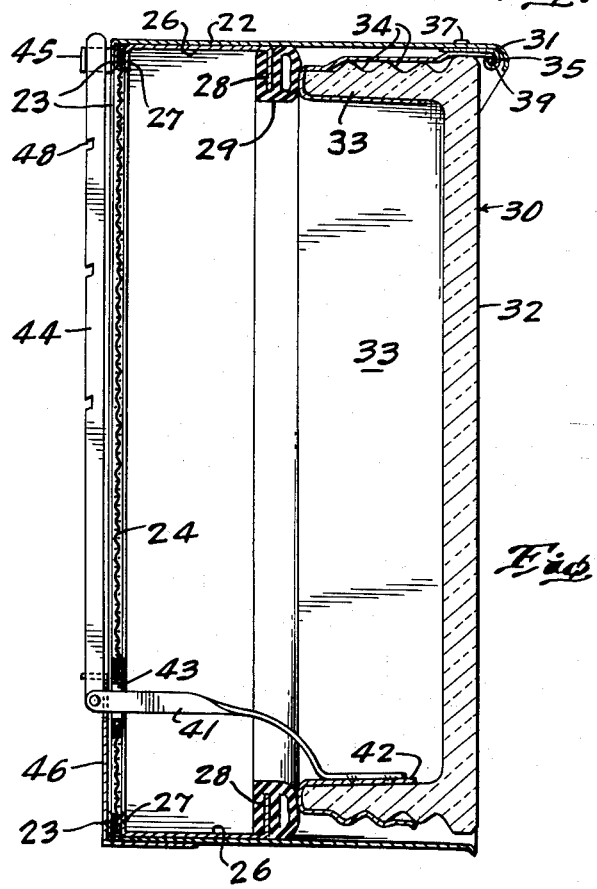
Fig. 3.
Fig. 4.
INVENTOR:
JOHN H. SUTTER.
BY
Rule and Hoge,
ATTYS.

INVENTOR:
JOHN H. SUTTER.
BY
Rule and Hoge
ATTYS.

March 20, 1956 J. H. SUTTER 2,738,838
GLASS BLOCK VENTILATING DEVICE
Filed June 4, 1952 4 Sheets-Sheet 3
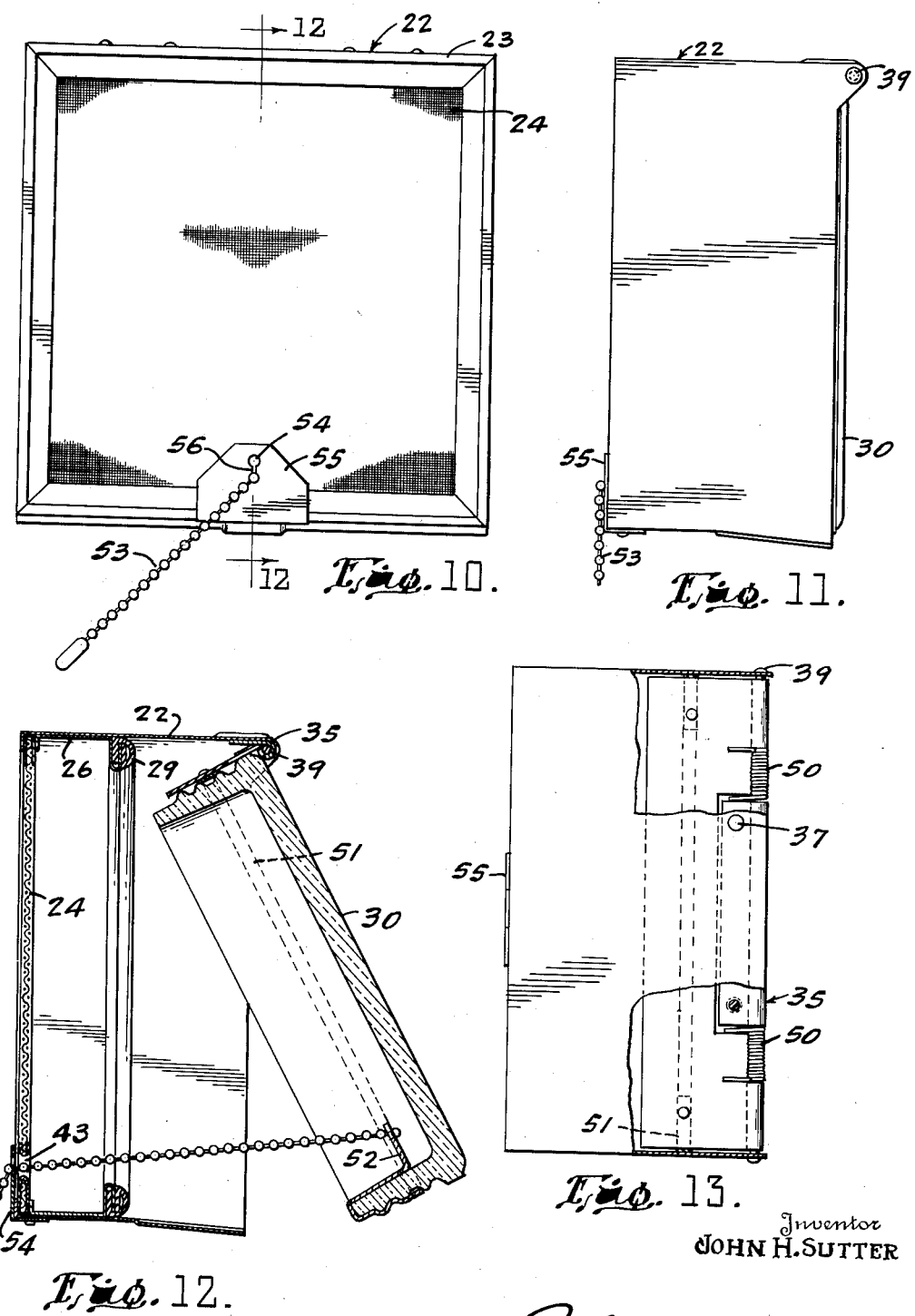
Inventor
JOHN H. SUTTER
By Rule and Hoge
Attorneys March 20, 1956 J. H. SUTTER 2,738,838
GLASS BLOCK VENTILATING DEVICE
Filed June 4, 1952 4 Sheets-Sheet 4
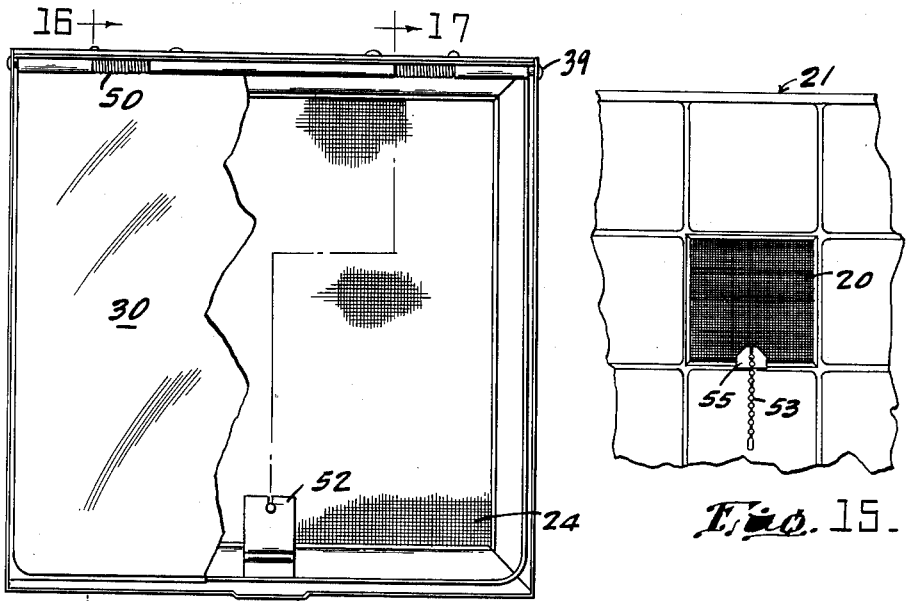
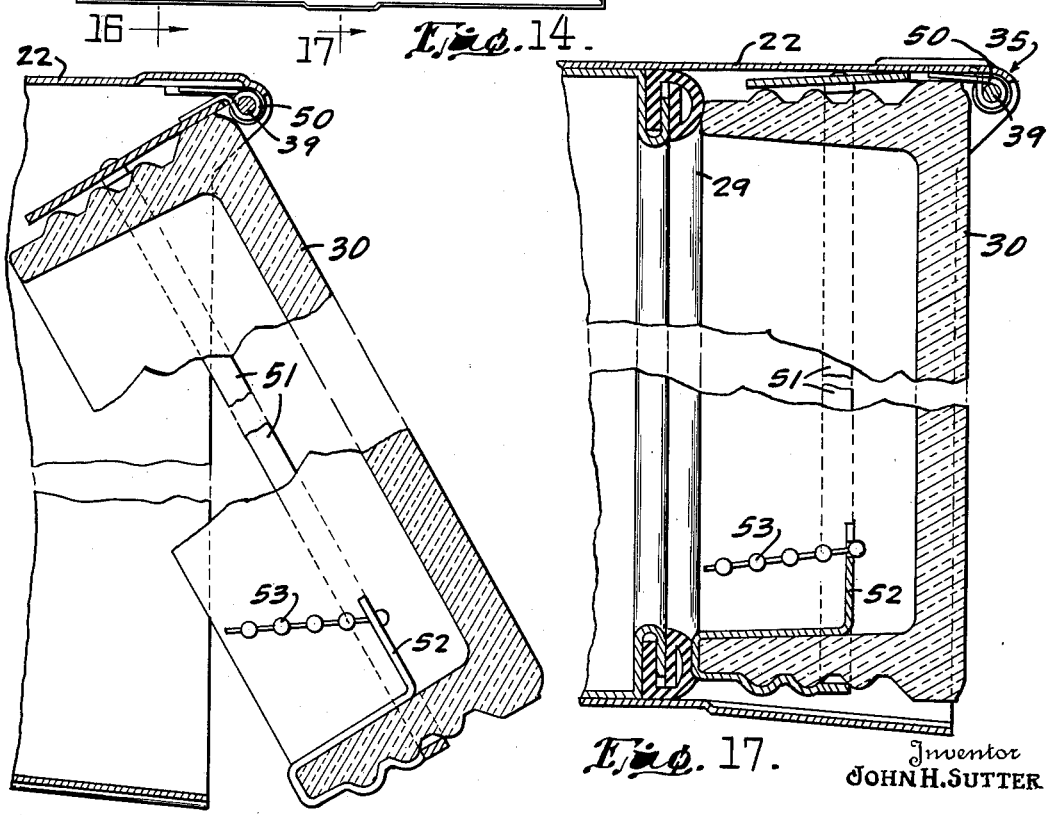
Inventor
JOHN H. SUTTER
By Rule and Hoge
Attorneys United States Patent Office 2,738,838
Patented Mar. 20, 1956

2,738,838

GLASS BLOCK VENTILATING DEVICE

John H. Sutter, Norcross, Ga., assignor to Owens-Illinois Glass Company, a corporation of Ohio Application June 4, 1952, Serial No. 291,648

4 Claims. (Cl. 160—95)

This invention relates to glass blocks and particularly to a ventilating device for glass block walls.

It is often desirable to provide ventilation in walls made of glass blocks. The current practice is to provide an opening in the glass block wall and mount a sash or door in the opening. Such a construction is rather complicated and expensive. In addition, the external appearance of the wall is usually marred by the construction.

It is therefore an object of this invention to provide a ventilating device overcoming these disadvantages and utilizing a glass block half.

Another object of the invention is to provide such a device which is easily and quickly mounted in position in the glass block wall.

Other objects of the invention will appear hereinafter.

Basically the invention comprises a frame in which a glass block half is mounted for pivotal movement. The construction includes a screen and means for pivoting the glass block half into and out of flush relationship with the wall.

Referring to the accompanying drawings:

Fig. 1 is a front elevational view of the ventilating device;

Fig. 2 is a fragmentary view of a wall incorporating the device;

Fig. 3 is a sectional view at the line 3—3 on Fig. 1;

Fig. 4 is a view as indicated by the line 4—4 on Fig. 1;

Fig. 10 is an elevational view of a modified form of the glass block ventilating device;

Fig. 11 is a side elevational view of the modified form of the device;

Fig. 12 is a sectional view at the line 12—12 on Fig. 10 with the glass block half in open position;

Fig. 13 is a part sectional plan view of the modified form of the ventilating device;

Fig. 14 is a front elevational view, with parts broken away, of the modified form of the device;

Fig. 15 is a fragmentary elevational view of a wall incorporating the modified form of the device;

Fig. 16 is a fragmentary sectional view at the line 16—16 on Fig. 14 with the glass block half in open position; and Fig. 17 is a fragmentary sectional view at the line 17—17 on Fig. 14.

Figures 5, 6:
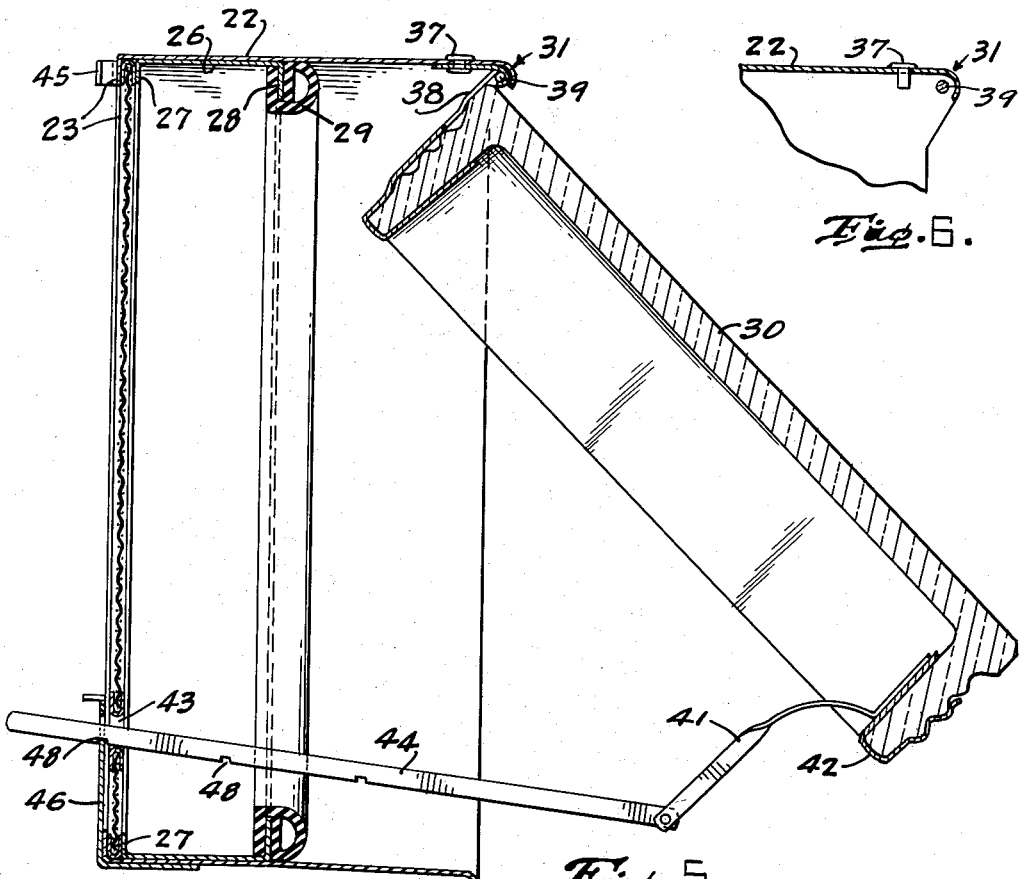
Fig. 5 is a view similar to that shown in Fig. 3 with the glass block half pivoted into open position.
Fig. 6 is a fragmentary sectional view of a corner of the frame of the device.

As shown in Fig. 2, the glass block ventilating device 20 which comprises this invention may be inserted in a glass block wall 21, in the place of a glass block. The glass blocks which form the wall 21 are of conventional construction and are made of two separate halves which are molded and then sealed together.

Referring to Figs. 1, 3, 4, and 5, the device includes a rectangular frame 22 with an internally extending peripheral flange 23. A screen 24 is positioned adjacent to the flange 23 in perpendicular relationship to the sides of the frame 22. The screen 24 is retained in position by a strip 26 extending around the interior of the frame and having an edge 27 adjacent to the screen. The inner marginal portion of the strip is turned inwardly to form a flange or edge 28 for retaining a gasket 29 in position on the interior of the frame. The gasket is made of resilient material for forming a sealing contact as presently described.

A glass block half 30 is pivotally mounted in the frame at one corner 31 thereof and movable into and out of sealing contact with the gasket. The glass block half 30 is of conventional construction and comprises a face 32 and a marginal flange 33. The marginal flange may be provided with corrugations or ribs 34 extending circumferentially on the external surface thereof.

Figure 7:
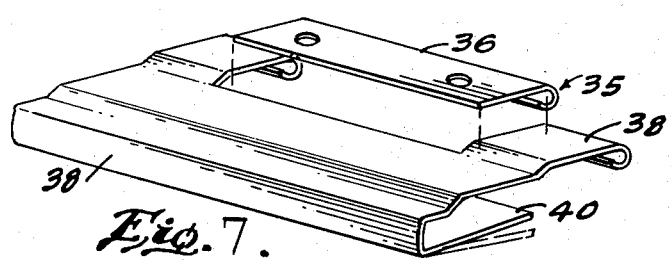
Fig. 7 is an isometric view of the hinge for mounting the glass block half.

The means for pivotally mounting the glass block half comprises a hinge 35. As shown in Fig. 7, the hinge includes a section 36 fastened by rivets 37 (Figs. 5 and 6) to the corner of the frame, and a second section 38 held in pivotal relationship to the first section by pin 39. The second section 38 of the hinge includes a U-shaped spring clamp portion 40 which springs into position to grip the upper marginal edge 33 of the glass block half 30 thereby retaining it in position. The glass block half may be easily removed and replaced at any time without affecting the mounting of the hinge.

Figure 8:
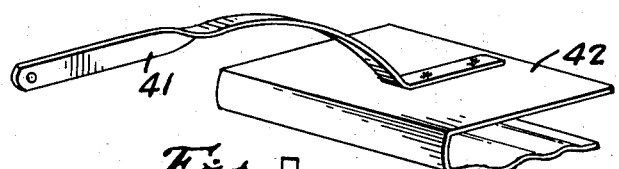
Fig. 8 is an isometric view of the clamp for moving the glass block half.

Means is also provided for moving the glass block half into and out of sealing position with the gasket. This includes an arm 41 fastened to a clamp 42 (Fig. 8). The clamp 42 is U-shaped and formed with corrugations which snap into position over the corrugations on the lower marginal edge of the glass block half. A rod 44 is pivoted to the end of the arm 41 and provides a means for operating the arm to in turn move the glass block half. When the glass block half is in sealing position with the gasket and has its face in vertical position the arm 41 extends through an opening 43 in the screen. A tab 45 is provided on the upper edge of the frame to lock the rod 44 and retain the glass block half in sealing position (Figs. 1, 3, and 4).

Figure 9:
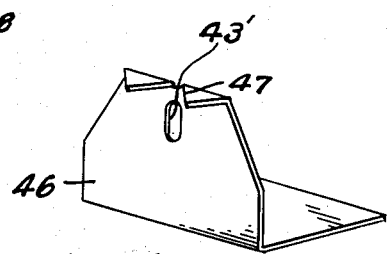
Fig. 9 is an isometric view of the bracket for holding the glass block half in open position.

A bracket 46 (Fig. 9) is fastened to the lower edge of the frame and extends upwardly adjacent to the screen and forms a U-shaped reinforcing edge 47 and an elongated opening 43' adjacent to the opening 43. Notches 48 are provided in the rod 44 and cooperate with the bracket 46 to retain the glass block half in various open positions (Fig. 5).

A modified form of the ventilating device is shown in Figs. 10 through 17. As shown in Figs. 12 and 13, a spring 50 is inserted in the hinge. This spring tends to keep the glass block half in open position out of sealing contact with the gasket. The glass block half is mounted to the hinge by means of a strap 51 which extends circumferentially around the marginal flange of the glass block half. A bracket 52 is fastened to the strap and the marginal edge of the flange. A chain 53 is connected to this bracket 52 and extends through the opening 43 in the screen and in turn through an opening 54 in bracket 55 fastened to the frame. The bracket 55 includes a small slot 56 extending downward from the opening 54 into which the chain may be forced and thereby retain the glass block half in any desired position. As shown in Fig. 16 the glass block half is in open position, whereas in Fig. 17 the glass block half is in sealing position with the gasket. In all other respects the modified form of ventilating device is the same as the form shown in Figs. 1 through 9.

In each form of the ventilating device the block half 30 may be of the same dimensions and a substantial duplicate of the surrounding block halves of the wall 21, the block half 30 when in closed position having its exterior surface flush with that of the wall 21.

Modifications may be resorted to within the spirit and scope of the appended claims.

I claim:

1. A ventilating device adapted to be built into a rectangular opening in a glass wall structure, said device including a rectangular supporting frame of a shape and size to fit within said rectangular opening, a glass block half mounted to swing out of and into a closed position within said frame, said glass block half comprising a vertical face and a horizontal flange portion extending inwardly from the inner surface of said face throughout the perimeter thereof, said frame comprising upper and lower horizontal ends and vertical sides, said frame being of materially greater horizontal depth than the glass block half, the means for mounting the glass block half comprising a hinge extending along the upper, outer edges of the frame and the glass block half by which said half is hinged for swinging movement from a closed position within and surrounded by said frame to an open position in which it is downwardly and outwardly inclined, and a sealing gasket mounted within said frame intermediate its front and rear edges in position to arrest the block half as it swings inward and form a seal between the glass block half and said frame when said glass block half is arrested in its closed position.

2. The structure defined in claim 1 and in combination therewith the said glass wall structure, the front edges of the supporting frame and the face of the glass block half being in a vertical plane and flush with the front face of the said wall structure when the glass block half is in closed position.

3. The structure set forth in claim 1, including a screen mounted in the said supporting frame behind the said gasket, a device for swinging the glass block half from open to closed position, said device extending from the block half rearwardly through an opening formed in the screen, and means for attaching said device to thhe flange portion of the block half, said attaching means comprising a spring clip embracing the said flange portion at the lower end of the block half, said clip and flange portion having cooperating corrugated surfaces by which the clip is removably attached, the clip being under tension permitting it to snap into position on the flange.

4. The structure set forth in claim 3, the said device for closing the glass block half comprising a chain attached to the said clip and extending through the opening in the screen, the wall of said opening being formed with a slit in which the chain may be adjustably held for holding the block half in any adjusted position, and spring means for yieldingly holding the glass half block in open position.

References Cited in the file of this patent

UNITED STATES PATENTS

| | | |
|---|---|---|
| 2,129,921 | Fogelberg | Sept. 13, 1938 |
| 2,352,029 | Soule | June 20, 1944 |
| 2,565,122 | Cowan | Aug. 21, 1951 |
| 2,611,310 | Cowan | Sept. 23, 1952 |